(12) United States Patent
Hosbach et al.

(10) Patent No.: US 10,093,214 B2
(45) Date of Patent: Oct. 9, 2018

(54) MECHANICAL MANUAL LEG TILT

(71) Applicant: Ford Global Technologies, LLC, Dearborn, MI (US)

(72) Inventors: Christian J. Hosbach, Taylor, MI (US); Marcos Silva Kondrad, Macomb, MI (US); Brian John Roorda, Farmington Hills, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 317 days.

(21) Appl. No.: 14/996,002

(22) Filed: Jan. 14, 2016

(65) Prior Publication Data

US 2017/0203674 A1 Jul. 20, 2017

(51) Int. Cl.
*B60N 2/62* (2006.01)
*B60N 2/433* (2006.01)
(Continued)

(52) U.S. Cl.
CPC ........... *B60N 2/929* (2018.02); *B60N 2/0284* (2013.01); *B60N 2/443* (2013.01); *B60N 2/4435* (2013.01); *B60N 2/62* (2013.01); *B60N 2/933* (2018.02)

(58) Field of Classification Search
CPC .... B60N 2/0284; B60N 2/1839; B60N 2/443; B60N 2/4435; B60N 2/16; B60N 2/929; B60N 2/933; B60N 2/62
(Continued)

(56) References Cited

U.S. PATENT DOCUMENTS 2,958,369 A 11/1960 Pitts et al.
3,215,386 A * 11/1965 Swenson ................ B60N 2/045
248/566

(Continued)

FOREIGN PATENT DOCUMENTS

EP 0754590 1/1997
EP 0926969 1/2002
(Continued)

OTHER PUBLICATIONS eCOUSTICS.COM, "Cineak Motorized Articulating Headrest Preview," http://www.ecoustics.com/ah/reviews/furniture/accessories/cineak-motorized-headrest, Oct. 9, 2012 (3 pages).
(Continued)

*Primary Examiner* — Milton Nelson, Jr.
(74) *Attorney, Agent, or Firm* — Vichit Chea; Price Heneveld LLP

(57) ABSTRACT

A vehicle seating assembly includes a seat frame. A support bracket is rotatably coupled with the seat frame, and is coupled with a front seat cushion tube supporting a forward portion of a seat. A spindle bracket is operably coupled with the frame. A position clamp includes a spring-biased piston rotatably coupled with the spindle bracket. A housing is slidably coupled with the piston, operable between fore and aft positions, and is rotatably coupled with a clamp mounting bracket, which is fixedly coupled with the support bracket. A release bar is operably coupled with the position clamp, is operable between lock and release positions, and is spring-biased to the lock position. A release handle is operably coupled to the release bar and configured to disengage the release bar from the lock position, thereby allowing sliding movement of the housing fore and aft relative to the piston.

17 Claims, 9 Drawing Sheets

(51) Int. Cl.
  *B60N 2/90* (2018.01)
  *B60N 2/44* (2006.01)
  *B60N 2/02* (2006.01)

(58) Field of Classification Search
  USPC .................................... 297/344.16, 284.11
  See application file for complete search history.

(56) References Cited

U.S. PATENT DOCUMENTS

| | | | |
|---|---|---|---|
| 3,403,938 A | 10/1968 | Cramer et al. | |
| 3,638,897 A | * 2/1972 | Harder, Jr. | ............ B60N 2/501 |
| | | | 248/550 |
| 3,929,374 A | 12/1975 | Hogan et al. | |
| 4,324,431 A | 4/1982 | Murphy et al. | |
| 4,334,709 A | 6/1982 | Akiyama et al. | |
| 4,353,595 A | 10/1982 | Kaneko et al. | |
| 4,541,669 A | 9/1985 | Goldner | |
| 4,629,248 A | 12/1986 | Mawbey | |
| 4,720,141 A | 1/1988 | Sakamoto et al. | |
| 4,884,843 A | 12/1989 | DeRees | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,352,310 B1 | 3/2002 | Schmidt et al. | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,802,563 B1 | 10/2004 | Mysliwiec et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,309,105 B2 | 12/2007 | Mundell et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,578,554 B2 | 8/2009 | Lee et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,371,655 B2 | 2/2013 | Nonomiya | |
| 2004/0195870 A1 | 10/2004 | Bohlender et al. | |
| 2005/0200166 A1 | 9/2005 | Noh | |
| 2006/0043777 A1 | 3/2006 | Friedman et al. | |
| 2007/0120401 A1 | 5/2007 | Minuth et al. | |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 3/2010 | Andersson et al. | |
| 2010/0140986 A1 | 6/2010 | Sawada | |
| 2010/0171346 A1 | 7/2010 | Laframboise et al. | |

(56) References Cited

U.S. PATENT DOCUMENTS

| | | |
|---|---|---|
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 1266794 | 3/2004 |
| EP | 1462318 A1 | 9/2004 |
| EP | 1123834 | 10/2004 |
| EP | 1050429 | 10/2005 |
| EP | 1084901 | 6/2006 |
| EP | 1674333 A1 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

M. Grujicic et al., "Seat-cushion and soft-tissue material modeling and a finite element investigation of the seating comfort for passenger-vehicle occupants," Materials and Design 30 (2009) 4273-4285.

"Thigh Support for Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

\* cited by examiner

MECHANICAL MANUAL LEG TILT

FIELD OF THE DISCLOSURE

The present disclosure generally relates to a vehicle seating assembly, and more particularly to a thigh support with a mechanical manual leg tilt for a vehicle seating assembly.

BACKGROUND OF THE DISCLOSURE

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE DISCLOSURE

According to one aspect of the present disclosure, a vehicle seating assembly includes a seat frame. A support bracket is rotatably coupled with the seat frame. The support bracket is coupled with a front seat cushion tube supporting a forward portion of a vehicle seat. A spindle bracket is operably coupled with the frame. A position clamp includes a spring-biased piston rotatably coupled with the spindle bracket. A housing is slidably coupled with the piston and is operable between fore and aft positions. The housing is rotatably coupled with a clamp mounting bracket. The clamp mounting bracket is fixedly coupled with the support bracket. A release bar is operably coupled with the position clamp and is operable between a lock position and a release position. The release bar is spring-biased to the lock position. A release handle is operably coupled to the release bar and is configured to disengage the release bar from the lock position, thereby allowing sliding movement of the housing fore and aft relative to the piston. The movement of the housing between the fore and aft positions rotates the support bracket between raised and lowered positions, respectively, which results in vertical movement of the support bracket, front seat cushion tube, and the forward portion of the vehicle seat.

According to another aspect of the present disclosure, a vehicle seating assembly includes a support bracket supporting a seat and rotatably coupled with a seat frame. A position clamp includes a piston rotatably coupled with the frame. A housing is slidably coupled with the piston and is rotatably coupled with the support bracket. A release bar is coupled with the position clamp and is operable to release the clamp to allow movement of the housing and vertical movement of the support bracket and the seat.

According to yet another aspect of the present disclosure, a vehicle seat thigh support assembly includes a support bracket rotatably coupled with a seat frame. A position clamp includes a piston rotatably coupled with the support bracket. A housing is slidably coupled with the piston and is rotatably coupled with the support bracket. A release assembly is operable between lock and release positions. Sliding movement of the housing relative to the piston rotates the support bracket upward, resulting in upward movement of a seat.

According to still another aspect of the present disclosure, a vehicle seat thigh support assembly includes a support bracket rotatably coupled with a seat frame. A position clamp is provided that is biased to raise the thigh support assembly to an elevated position. A lever is provided that allows for a user to apply weight to the vehicle seat thigh support assembly. The vehicle seat thigh support assembly is lockable between a multitude of raised and lowered positions. The disclosed structure provides a strong and affordable, yet lightweight, structure that provides increased comfort to an occupant.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
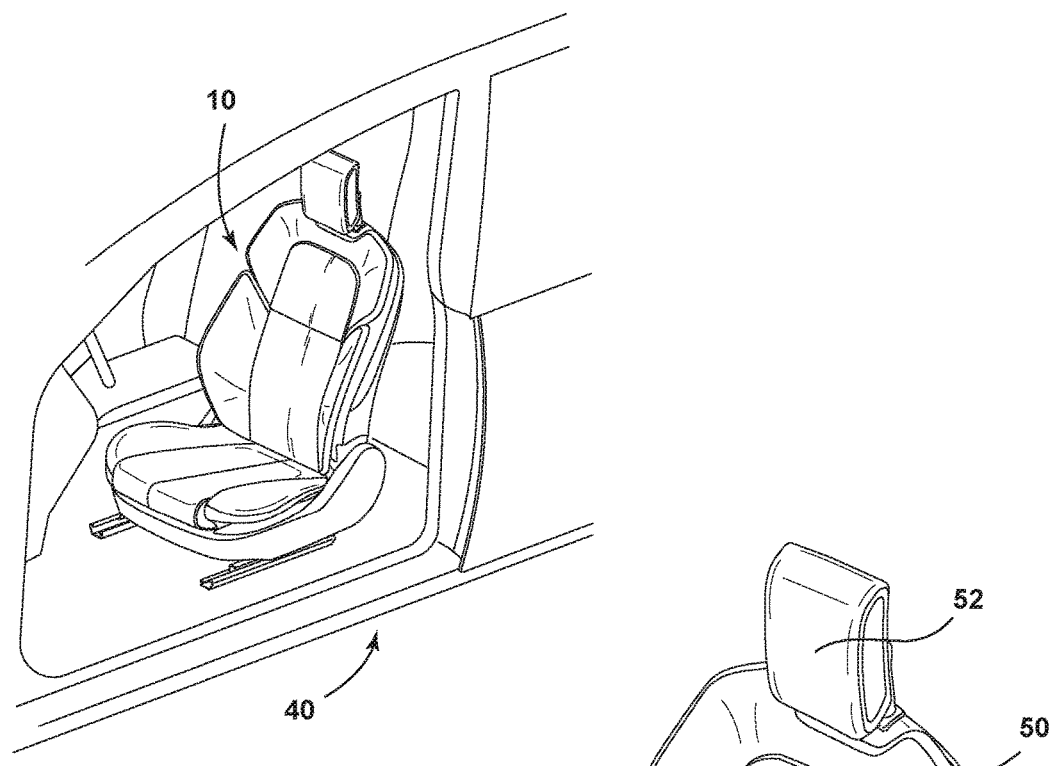
FIG. 1 is a top perspective view of one embodiment of a vehicle seating assembly of the present disclosure disposed in a vehicle.
Figure 2:
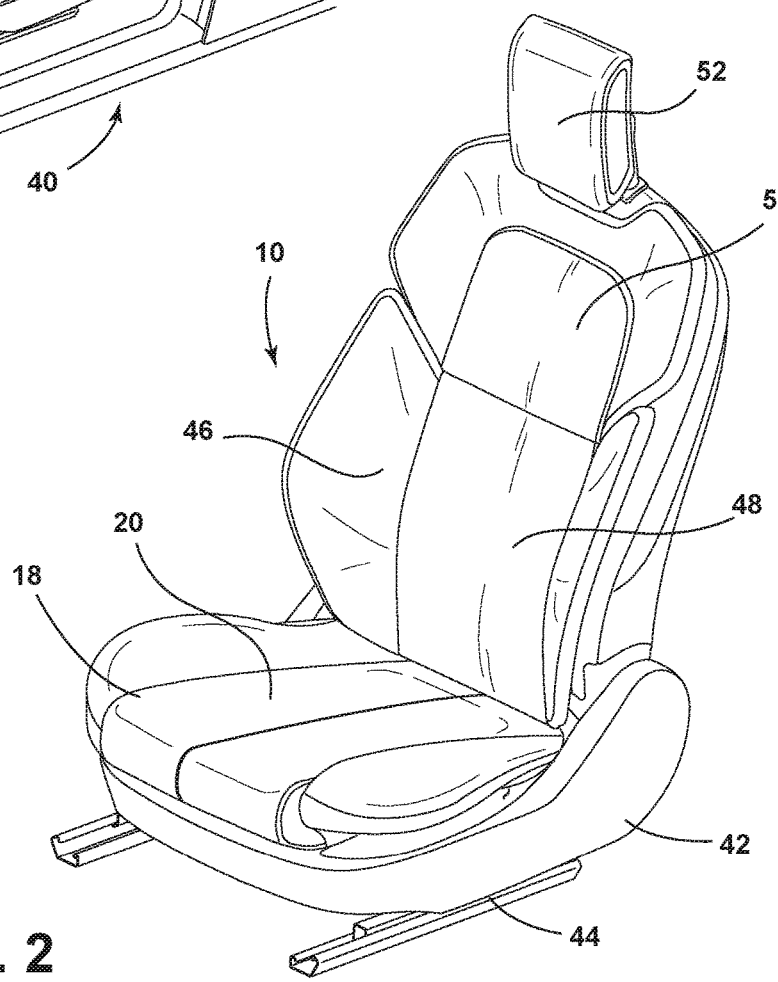
FIG. 2 is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-8A, reference numeral 10 generally designates a vehicle seating assembly having a seat frame 12. A support bracket 14 is rotatably coupled with the seat frame 12. The support bracket 14 is coupled with a front seat cushion tube 16 supporting a forward portion 18 of a vehicle seat 20. A spindle bracket 22 is operably coupled with the seat frame 12. A position clamp 24 includes a spring-biased piston 26 rotatably coupled with the spindle bracket 22. A housing 28 is slidably coupled with the piston 26 and is operable between fore and aft positions. The housing 28 is rotatably coupled with a clamp mounting bracket 30. The clamp mounting bracket 30 is fixedly coupled with the support bracket 14. A release bar 32 is operably coupled with the position clamp 24 and is operable between a lock position and a release position. The release bar 32 is spring-biased to the lock position. A release handle 34 is operably coupled to the release bar 32 and is configured to disengage the release bar 32 from the lock position, thereby allowing sliding movement of the housing 28 fore and aft relative to the piston 26. The movement of the housing 28 between the fore and aft positions rotates the support bracket 14 between raised and lowered positions, respectively, which results in vertical movement of the support bracket 14, the front seat cushion tube 16, and the forward portion 18 of the vehicle seat 20.

With reference again to FIGS. 1 and 2, the present disclosure is generally directed to a vehicle seating assembly 10 for use in a vehicle 40, such as a car, a truck, a van, etc. It is also contemplated that the concept set forth in this disclosure may be utilized in a front or forward seat of the vehicle 40 as well as rearward seats of the vehicle 40. The vehicle seating assembly 10, as illustrated, includes a seat base 42 that is positioned on rail slides 44 to allow fore and aft movement of the vehicle seating assembly 10 relative to the vehicle 40. The vehicle seat 20 is positioned on the seat base 42 and is movable relative thereto, as set forth in further detail below. In addition, the vehicle seating assembly 10 includes a seatback 46 having a lower lumbar region 48 and an upper thoracic region 50 as well as a head restraint 52. Each of the components of the seatback 46 may be configured for adjustability to properly support the weight of various occupants inside the vehicle 40.

Figure 3:
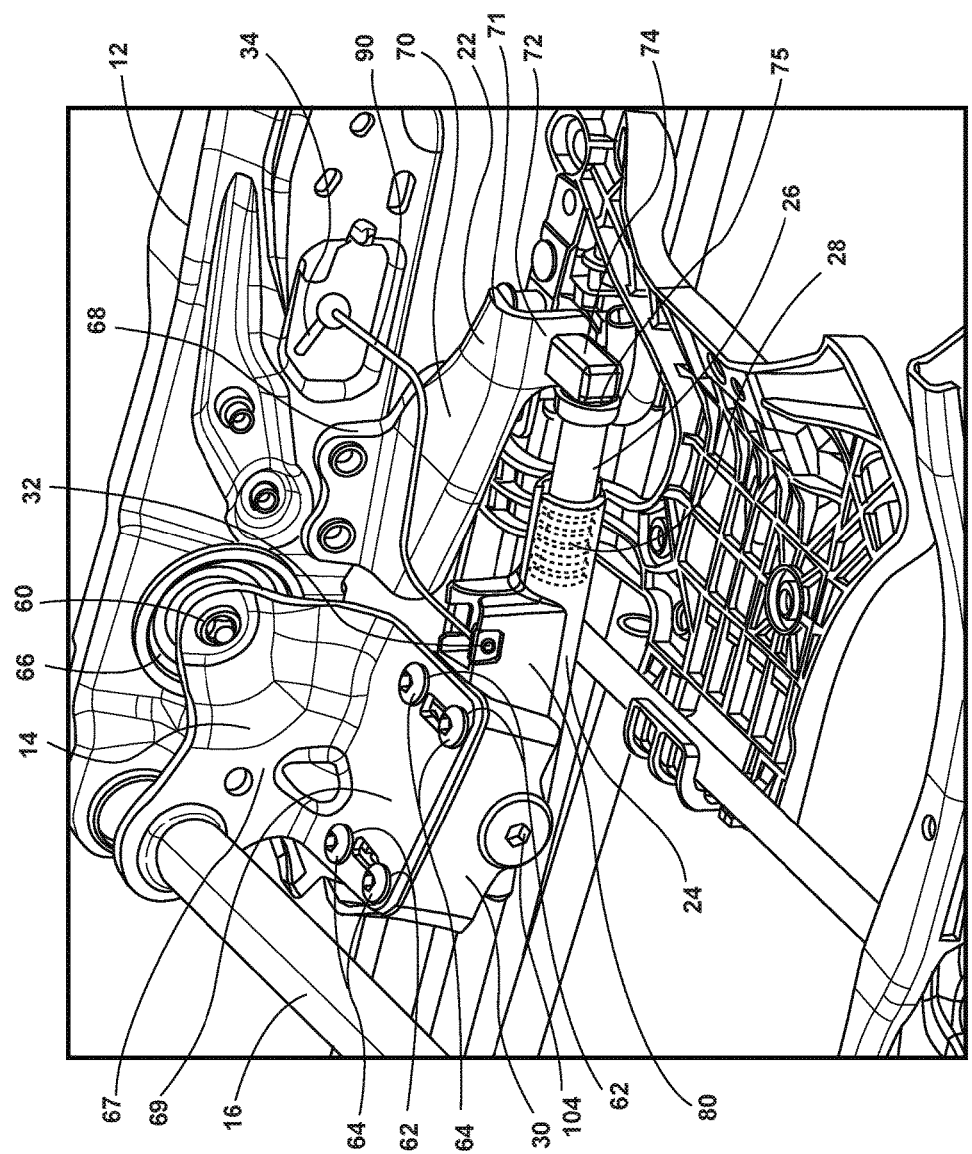
FIG. 3 is a bottom perspective view of one embodiment of a manual leg tilt assembly of the present disclosure.

With reference now to FIG. 3, an underside of the vehicle seating assembly is illustrated, with a seat cushion removed from the vehicle seating assembly 10. The support bracket 14 is rotatably coupled with the seat frame 12 at a pivot pin 60. The pivot pin 60 is juxtaposed behind the front seat cushion tube 16. Accordingly, the front seat cushion tube 16 is configured to rotate relative to the pivot pin 60, which results in the seat cushion tube 16 and the forward portion 18 of the vehicle seat 20 to rotate upward. The support bracket 14 also includes a plurality of fastener apertures 62 configured to receive mechanical fasteners 64 that secure the clamp mounting bracket 30 thereto. The clamp mounting bracket 30 is rotatably coupled with the position claim 24 and configured to rotate relative to the position clamp 24. The support bracket 14 and the pivot pin 60 are received in a recess 66 defined in the seat frame 12. The support bracket 14 includes a body 67 and a connection portion 69 extending orthogonal to the body 67. The seat frame 12 also supports the spindle bracket 22. The spindle bracket 22 is located behind the pivot pin 60 and includes a generally vertically-oriented connecting portion 68 and a generally lateral body portion 70. A rear end 71 of the body portion 70 includes a downwardly turned lip 72 that is configured to engage a rotatable fastener 74 at a rear end 75 of the position clamp 24.

Figure 4:
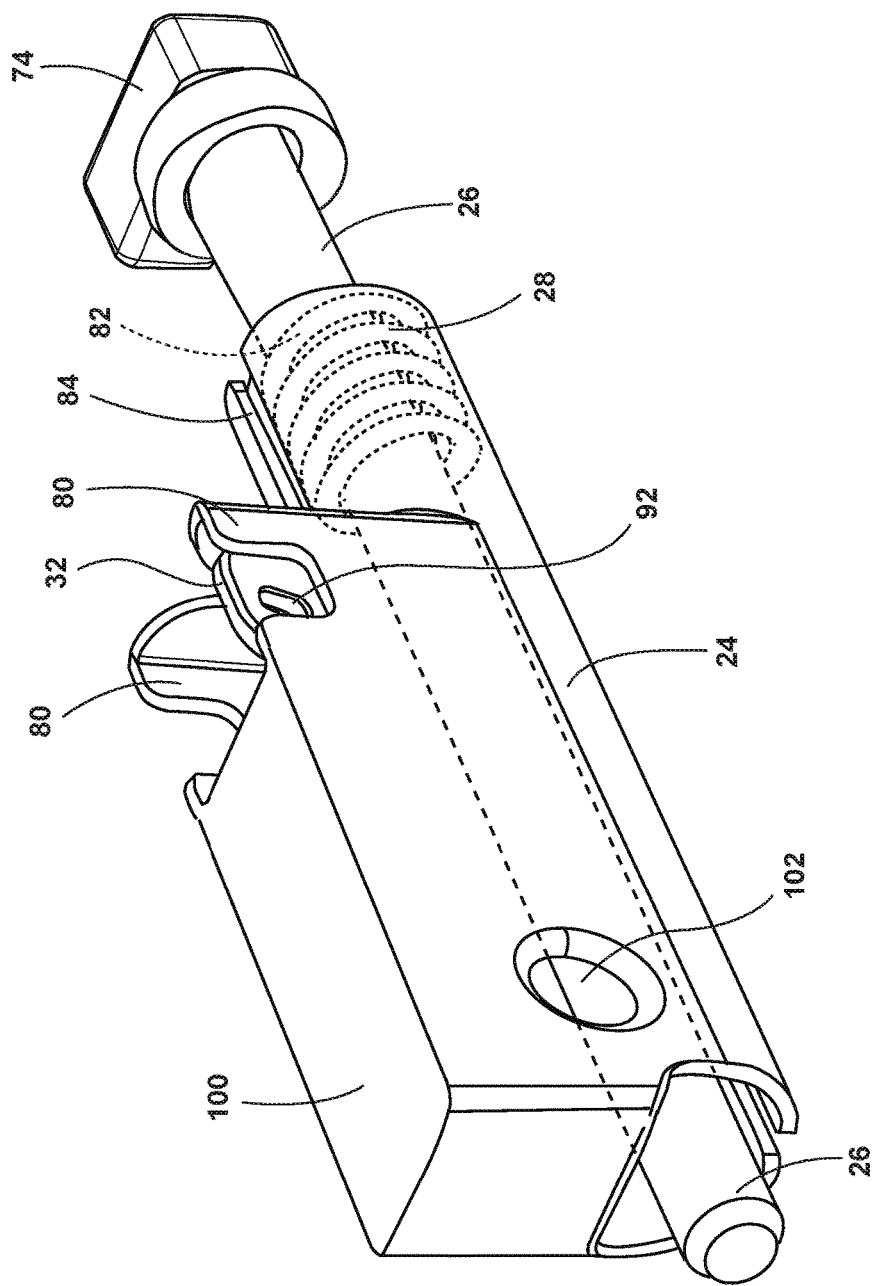
FIG. 4 is a top perspective view of a position clamp for use in a manual leg tilt assembly.

With reference now to FIG. 4, the rotatable fastener 74 is operably coupled with the spring-biased piston 26 that is disposed in the position clamp 24. The piston 26 extends forward into the housing 28, which in turn is coupled with the clamp mounting bracket 30. The housing 28 includes upwardly extending guide walls 80 configured to limit movement of the release bar 32 as the release bar 32 moves between the lock position and the release position. A spring 82 is disposed inside the housing 28 between a fixed washer 83 and a rear inside wall 85 of the housing 28. In the illustrated embodiment, the spring 82 is a compression spring. However, it will be understood that a tension spring could also be utilized that may apply tension between the fixed washer 83 and a forward inside wall 87 of the housing 28 (see FIG. 8).

Referring again to FIG. 4, a top portion of the housing 28 includes a longitudinal slot 84. The release bar 32, which is disposed between the guide walls 80, is configured to rotate to the lock position, which results in a tightening on the piston 26 and locks the piston 26 in place. Consequently, the piston 26 is prohibited from moving between fore and aft positions when the release bar 32 is in the lock position. In the illustrated embodiment, the release bar 32 is in the lock position. However, it will be generally understood that a cable 90 may be configured to extend into an aperture 92 on the release bar 32 and extend to a position outside of the vehicle seating assembly 10. A user can actuate a lever, which will result in movement of the release bar 32 from the lock position to the release position, which will result in movement of the piston 26 relative to the housing 28, as will be disclosed in further detail below.

With reference again to FIG. 4, the housing 28 of the position clamp 24 also includes a forward portion 100 having an aperture 102 extending therethrough. The aperture 102 is configured to receive a pin 104 that operably couples the support bracket 14 with the position clamp 24. The pin 104 includes a head 105 that prevents over insertion of the pin 104 into the aperture 102. As previously noted, the housing 28 of the position clamp 24 is free to move fore and aft, but is biased to a forward position as a result of the pressure applied by the compression spring 82 proximate the rotatable fastener 74 at the rear end 75 of the piston 26.

Figure 5:
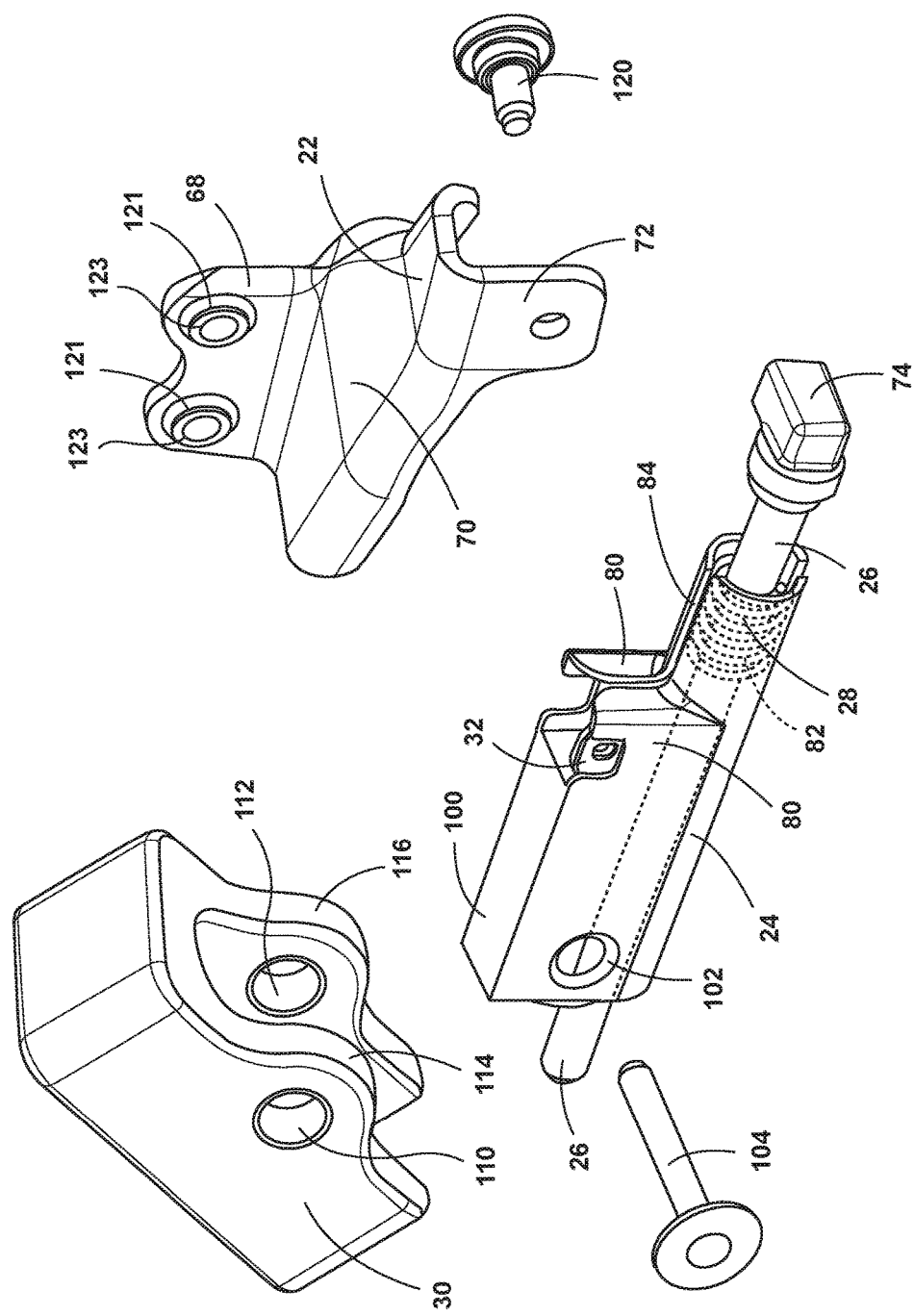
FIG. 5 is a top perspective exploded view of the position clamp of FIG. 4.
Figure 6:
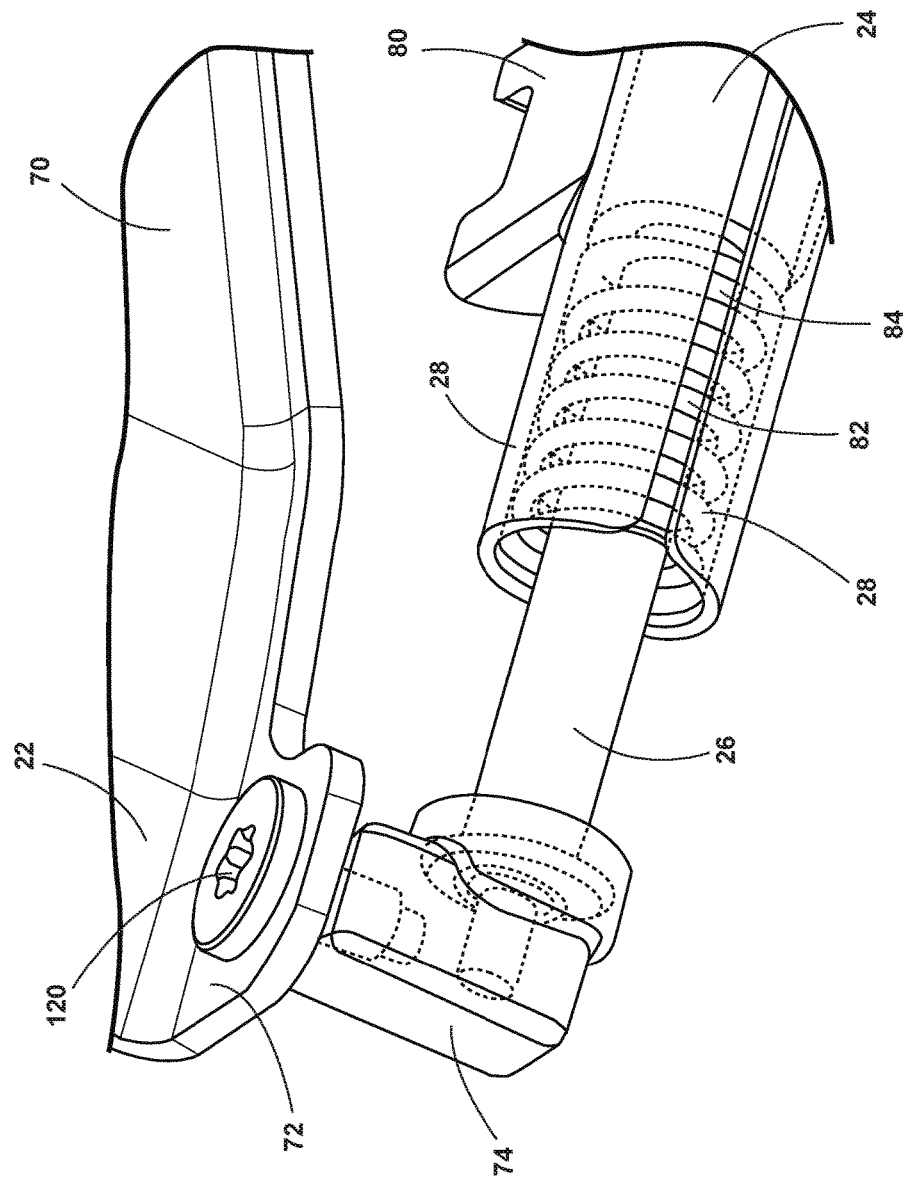
FIG. 6 is a bottom perspective view of one embodiment of a pivotal connection between the piston and spindle bracket.

With reference now to FIG. 5, the pin 104 also extends through first and second receiving apertures 110, 112 of the clamp mounting bracket 30. Notably, the clamp mounting bracket 30 is securely fastened with the support bracket 14. The first and second receiving apertures 110, 112 of the clamp mounting bracket 30 are defined through bulbous portions 114, 116 of the clamp mounting bracket 30. On the rear end 75 of the piston 26, the rotatable fastener 74 is engaged with a pin 120 that allows for rotational movement of the rotatable fastener 74, and consequently the piston 26 relative to the spindle bracket 22. Consequently, the position clamp 24 is free to move or rotate vertically as the support bracket 14 rotates with the front seat cushion tube 16 and the forward portion 18 of the vehicle seat 20. The spindle bracket 22 includes apertures 121 that receive apertures 123 that secure the spindle bracket 22 to the seat frame 12.

Figure 7:
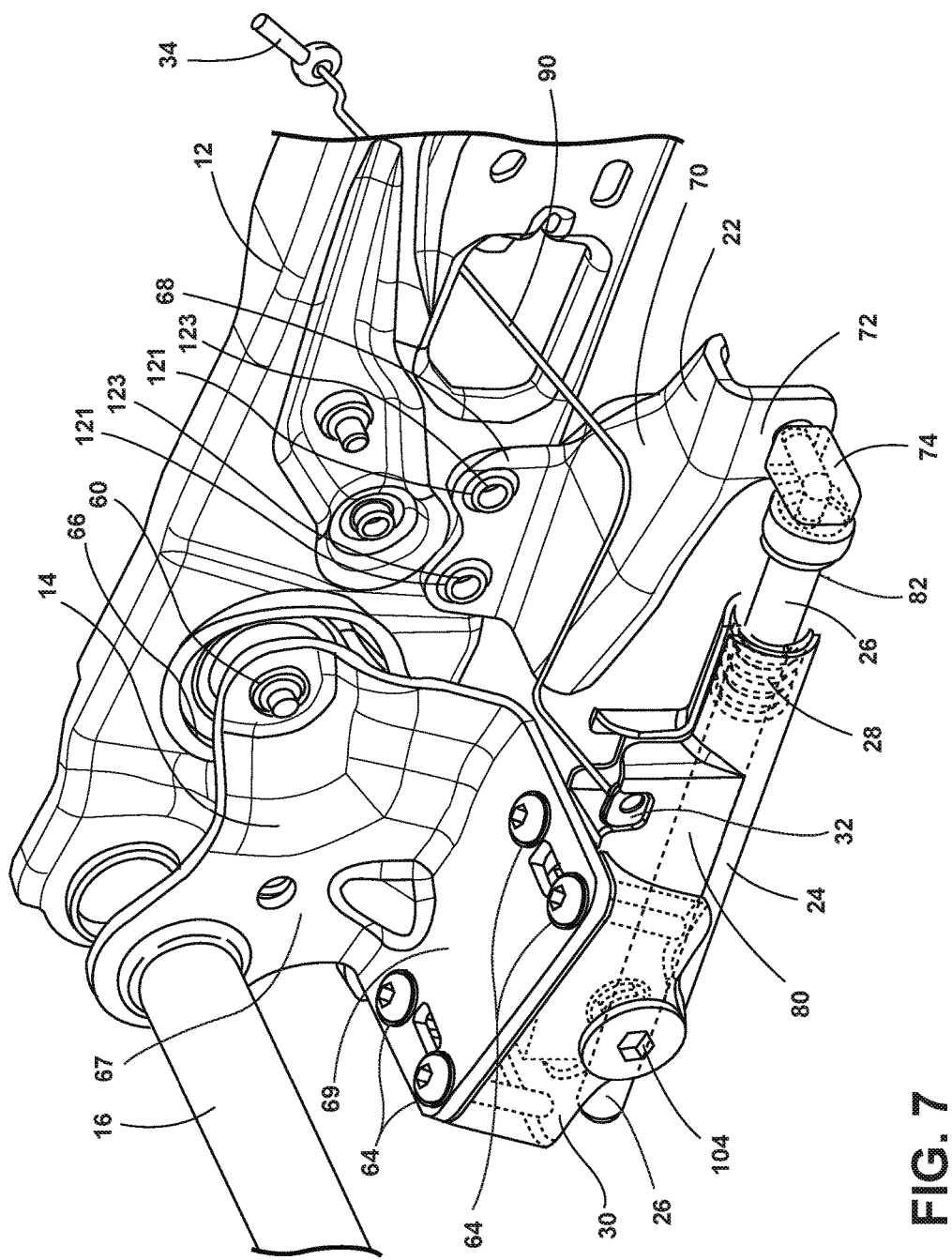
FIG. 7 is a side perspective view of the manual leg tilt assembly of FIG. 3 with the release bar in a locked position.
Figure 7A:
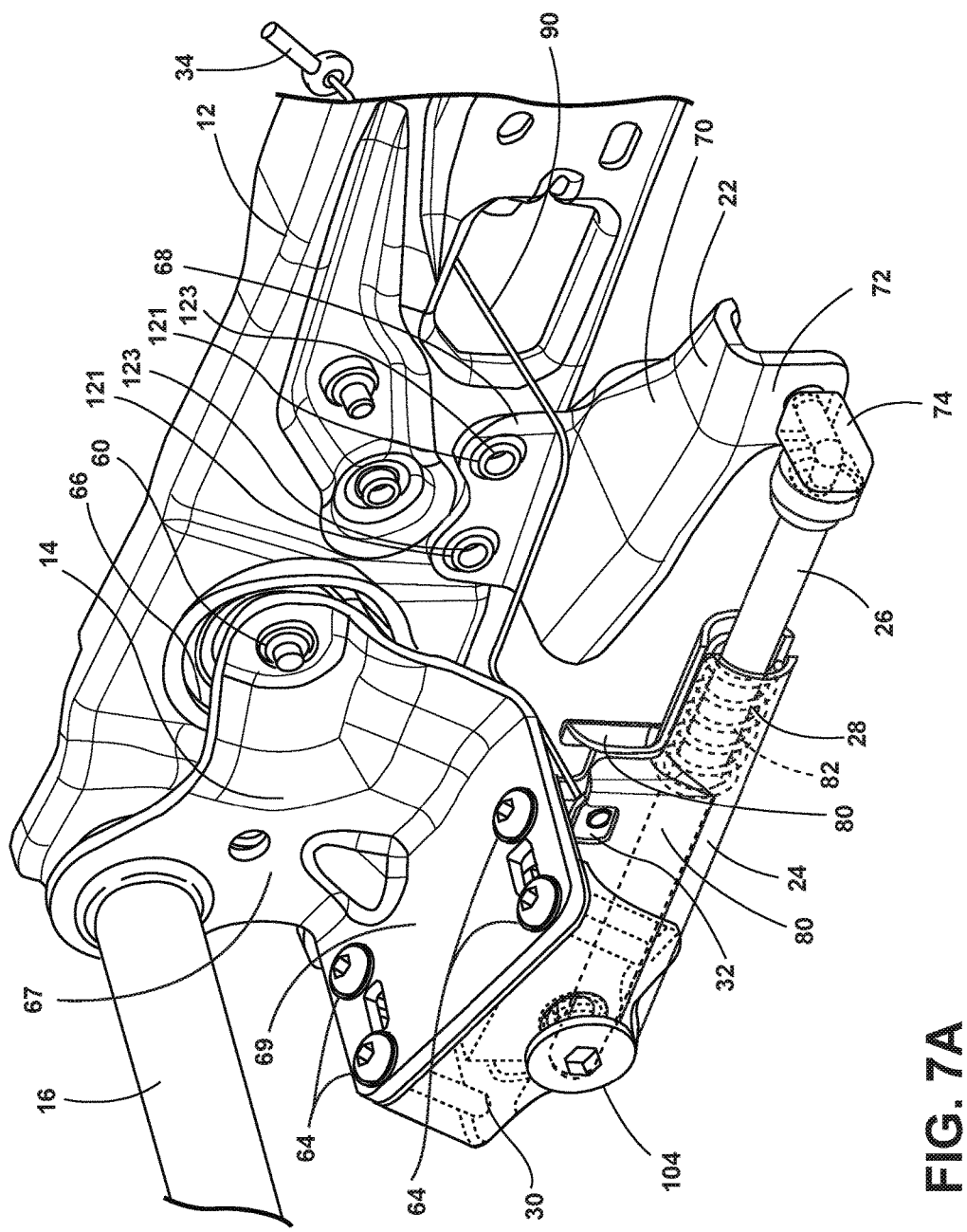
FIG. 7A is a bottom perspective view of the manual leg tilt assembly of FIG. 3 with the release bar in a release position.

With reference now to FIGS. 7 and 7A, in use, a manual leg tilt assembly works as follows. An occupant would sit on the vehicle seat 20. If the occupant feels that additional leg support may be needed under the thighs of the legs of the occupant, then the occupant can adjust the forward portion 18 of the vehicle seat 20 upward. Conversely, if the occupant feels that the forward portion 18 of the vehicle seat 20 is raised too high, then the occupant can lower the forward portion 18 of the vehicle seat 20.

Figure 8:
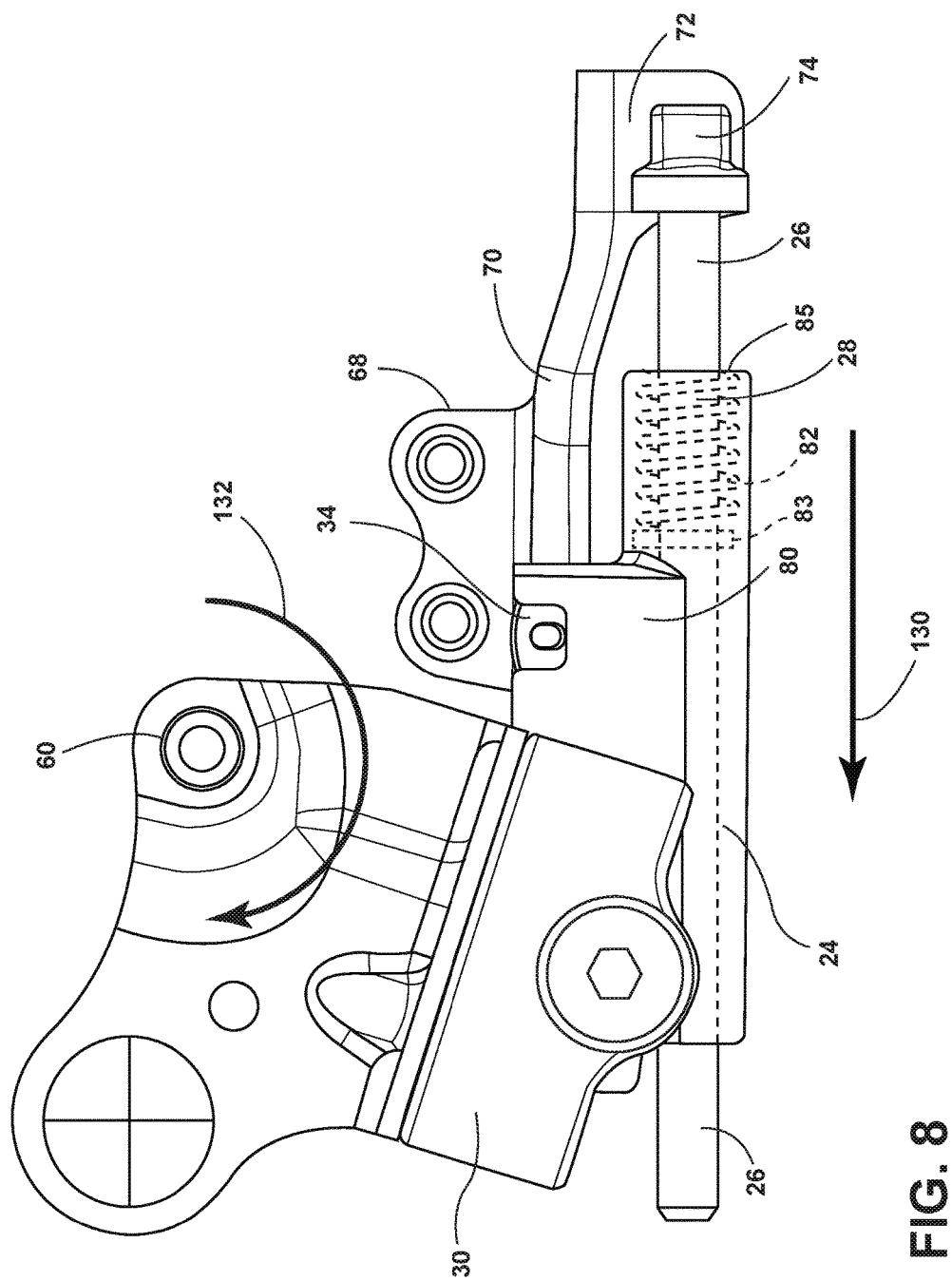
FIG. 8 is a side elevational view of the manual tilt leg assembly with a front seat cushion tube of a seat in a raised position.
Figure 8A:
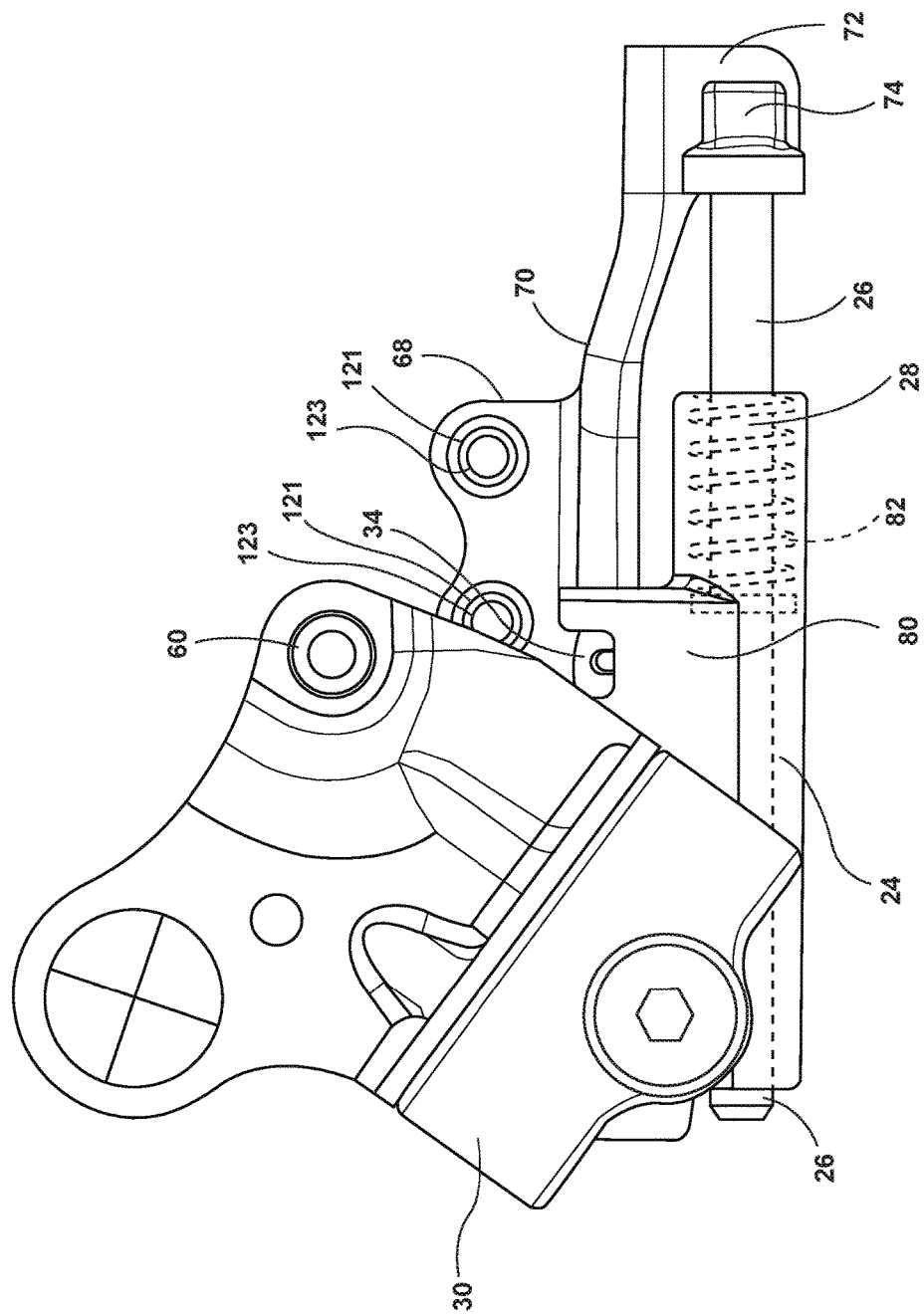
FIG. 8A is a side elevational view of the manual tilt leg assembly with the front seat cushion tube of the seat of FIG. 8 in a lowered position.

With reference to FIGS. 8 and 8A, the position clamp 24 is in a rearward position associated with the forward portion 18 of the vehicle seat 20 being in a lowered position. The release handle 34 can be adjusted to draw the cable 90, which results in the release bar 32 moving from the lock position to the release position. Once the release bar 32 has been moved from the lock position to the release position, the spring 82 pushes the housing 28 forward in the direction of arrow 130. As the housing 28 slides over the piston 26 in the forward direction, the pivot pin 104 allows for rotation of the clamp mounting bracket 30 upward in a clockwise direction (see arrow 132, FIG. 8). As the clamp mounting bracket 30 rotates upward and forward, so too does the support bracket 14. As the support bracket 14 rotates clockwise, the front seat cushion tube 16, and consequently the forward portion 18 of the vehicle seat 20, also raises. When the occupant has determined that the forward portion 18 of the vehicle seat 20 has reached a desired height, the occupant can then release the release handle 34, which results in the release bar 32, which is spring-biased to the lock position, to move back to the lock position and securely locate the housing 28 relative to the new position on the piston 26. The forward portion 18 of the vehicle seat 20 is now in a secured position and configured to support the forward thighs of the occupant. In the event the occupant wishes to lower the forward portion 18 of the vehicle seat 20, the occupant simply pulls the release handle 34, which again releases the release bar 32 from the lock position. The release bar 32 is pulled against the spring-bias, which biases the release bar 32 to the lock position, and the housing 28 is free to move over the piston 26 of the position clamp 24. Consequently, the housing 28 under the bias of spring 82 will move forward, unless the housing 28 is at a full forward position on the piston 26. In this instance, the housing 28 would not move any further forward. It is generally contemplated that a stop may be used to prohibit further movement of the housing over the piston 26, or the compression spring may simply reach a fully expanded state, in which case the compression spring 82 does not urge the housing 28 forward over the piston 26 any further. If the housing 28 has not reached a full forward position relative to the piston 26, then the housing 28 will continue to be urged forward under the spring-bias of spring 82. Regardless, for an occupant to lower the forward portion 18 of the vehicle seat 20, the occupant simply applies pressure to the forward portion 18 of the vehicle seat 20, resulting in the lowering of the forward portion 18 of the vehicle seat 20. The pressure is typically applied by application of the weight of the occupant to the forward portion 18 of the vehicle seat 20. As pressure, or the loading of the occupant, is applied to the forward portion 18 of the vehicle seat 20, the forward portion 18 of the vehicle seat 20 will begin to lower. Once a desired height has been reached by the occupant, the occupant can then release the release handle 34, which results in movement of the release bar 32 back to the lock position. The release bar 32 has now secured the housing 28 relative to the piston 26.

The aforementioned manual leg tilt assembly provides a simple, easy-to-use, and reliable system that allows for easy adjustment of the forward portion of a vehicle seat while keeping overall costs and weight reduced on the overall vehicle seating assembly.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seat frame;
   a support bracket rotatably coupled with the seat frame, the support bracket also being coupled with a front seat cushion tube supporting a forward portion of a vehicle seat;
   a spindle bracket operably coupled with the frame;
   a position clamp including:
      a spring-biased piston rotatably coupled with the spindle bracket; and
      a housing slidably coupled with the piston and operable between fore and aft positions, the housing being rotatably coupled with a clamp mounting bracket, wherein the clamp mounting bracket is fixedly coupled with the support bracket;
   a release bar operably coupled with the position clamp and operable between a lock position and a release position, the release bar being spring-biased to the lock position; and
   a release handle operably coupled to the release bar and configured to disengage the release bar from the lock position, thereby allowing sliding movement of the housing fore and aft relative to the piston; wherein the movement of the housing between the fore and aft positions rotates the support bracket between raised and lowered positions, respectively, which results in vertical movement of the support bracket, front seat cushion tube, and the forward portion of the vehicle seat.

2. The vehicle seating assembly of claim 1, further comprising:
   a fastener disposed on an end of the spring-biased piston; and
   a spring disposed between the fastener and the housing.

3. The vehicle seating assembly of claim 1, further comprising:
   a release cable operably coupling the release bar with the release handle.

4. The vehicle seating assembly of claim 1, wherein the release bar is disposed on a top portion of the housing.

5. The vehicle seating assembly of claim 1, wherein a forward portion of the spring-biased piston protrudes from the housing.

6. The vehicle seating assembly of claim 1, wherein the position clamp is disposed below the seat frame.

7. A vehicle seating assembly comprising:
   a support bracket supporting a seat and rotatably coupled with a seat frame;
   a position clamp including:
      a piston rotatably coupled with the frame;
      a housing slidably coupled with the piston and rotatably coupled with the support bracket; and
   a release bar on a top of the housing and configured to release the position clamp allowing movement of the housing and vertical movement of the support bracket and the seat.

8. The vehicle seating assembly of claim 7, wherein the housing is rotatably coupled with a clamp mounting bracket, and wherein the clamp mounting bracket is fixedly coupled with the support bracket.

9. The vehicle seating assembly of claim 7, further comprising:
   a release handle operably coupled to the release bar and configured to disengage the release bar from a lock position, thereby allowing sliding movement of the housing fore and aft relative to the piston.

10. The vehicle seating assembly of claim 7, further comprising:
    a fastener disposed on an end of the piston; and
    a spring disposed between the fastener and the housing.

11. The vehicle seating assembly of claim 7, further comprising:
    a release cable operably coupling the release bar with a release handle.

12. The vehicle seating assembly of claim 7, wherein the position clamp is disposed below the seat frame.

13. The vehicle seating assembly of claim 7, wherein a forward portion of the piston protrudes from the housing.

14. A vehicle seat thigh support assembly comprising:
    a support bracket rotatably coupled with a seat frame;
    a position clamp including:
       a piston rotatably coupled with the support bracket; and
       a housing slidably coupled with the piston and rotatably coupled with the support bracket;
    a release assembly operable between lock and release positions, wherein sliding movement of the housing relative to the piston rotates the support bracket upward, resulting in upward movement of a seat; and
    wherein the release assembly includes a release cable operably coupling a release bar with a release handle.

15. The vehicle seat thigh support assembly of claim 14, further comprising:
    a fastener disposed on an end of the piston; and
    a spring disposed between the fastener and the housing.

16. The vehicle seat thigh support assembly of claim 14, wherein the housing is rotatably coupled with a clamp mounting bracket, and wherein the clamp mounting bracket is fixedly coupled with the support bracket.

17. The vehicle seat thigh support assembly of claim 14, further comprising:
    the release handle being configured to disengage the release bar from a lock position, thereby allowing sliding movement of the housing fore and aft relative to the piston.

* * * * *